United States Patent [19]
Toujima et al.

[11] Patent Number: 5,999,654
[45] Date of Patent: Dec. 7, 1999

[54] IMAGE PROCESSOR CAPABLE OF TRANSFERRING IMAGE DATA FROM AN INPUT BUFFER TO MEMORY AT A HIGH RATE OF SPEED

[75] Inventors: Masayoshi Toujima; Yasuo Kohashi; Hitoshi Fujimoto; Tomonori Yonezawa; Masatoshi Matsuo; Shunichi Kurohmaru, all of Fukuoka, Japan

[73] Assignee: Matsushita Electric Industrial Co., Ltd., Osaka, Japan

[21] Appl. No.: 08/895,615

[22] Filed: Jul. 16, 1997

[30] Foreign Application Priority Data

Jul. 17, 1996 [JP] Japan .................................. 8-187162

[51] Int. Cl.[6] ..................................................... G06K 9/36
[52] U.S. Cl. .......................... 382/232; 395/114; 710/131
[58] Field of Search .................................... 382/232, 305, 382/307; 358/444; 710/6, 31, 38, 52, 131; 395/114, 115

[56] References Cited

U.S. PATENT DOCUMENTS

| | | | |
|---|---|---|---|
| 5,453,786 | 9/1995 | Trent ....................................... | 348/384 |
| 5,485,212 | 1/1996 | Frederick ................................ | 348/415 |
| 5,502,494 | 3/1996 | Auld ........................................ | 348/426 |
| 5,671,299 | 9/1997 | Oshida .................................... | 382/307 |
| 5,727,087 | 3/1998 | Matoba et al. ......................... | 382/232 |
| 5,757,965 | 5/1998 | Ohki ....................................... | 382/232 |

FOREIGN PATENT DOCUMENTS

| | | | |
|---|---|---|---|
| 7-240918 | 9/1995 | Japan ............................... | H04N 7/30 |
| 8-125988 | 5/1996 | Japan ............................... | H04N 7/10 |

*Primary Examiner*—Andrew W. Johns
*Attorney, Agent, or Firm*—McDermott, Will & Emery

[57] ABSTRACT

A bus switch is connected among an input buffer memory, a data memory, and an encoding unit, to select between a first bus connection of the input buffer memory and the data memory and a second bus connection of the data memory and the encoding unit. A data transfer control unit controls the bus switch to select the first bus connection in response to a data request signal from the encoding unit, controls the process of reading from the input buffer memory and the process of writing into the data memory, controls the bus switch to select the second bus connection upon completion of the transfer of one unit of image data, and sends a transfer completion signal in order of causing the encoding unit to start performing encoding processing. This makes it possible to transfer image data from the input buffer memory to the data memory at high speed.

22 Claims, 9 Drawing Sheets

IMAGE PROCESSOR CAPABLE OF TRANSFERRING IMAGE DATA FROM AN INPUT BUFFER TO MEMORY AT A HIGH RATE OF SPEED

BACKGROUND OF THE INVENTION

This invention relates to an image processor which encodes image data.

In videotelephone, video conference system, or the like over communication line, encoding is an indispensable technology for the transmission of enormous amounts of image data, for communication lines are slow in data transmission. H.261 and H.263, recommendations by ITU-T (International Telecommunication Union—Telecommunication Standardization Sector), have been known as employable encoding systems. Also, other encoding systems named after the experts groups of ISO (International Organization for Standardization) have been known, such as JPEG (Joint Photographic Coding Experts Group) and MPEG (Moving Picture Experts Group). JPEG is the international standard for color still picture compression, and MPEG is the international standard for multimedia moving picture compression.

A typical image processor has an input buffer memory formed of an FIFO (first-in first-out) memory for temporarily holding input image data, a data memory formed of a static RAM (SRAM) for storing the image data transferred from the input buffer memory, and an encoding unit for encoding the image data stored in the data memory. For the realization of various encoding systems with a single image processor, the encoding unit is formed of a program-controllable processor and a change in the encoding program executed in the processor is made. The encoding unit repeats an operation of reading image data from the input buffer memory, inputting the image data, and writing the image data to the data memory, whereby the transfer of one unit (for example, one frame) of image data from the input buffer memory to the data memory is carried out. Thereafter, the encoding unit starts encoding the image data stored in the data memory.

It is difficult for the above-described image processor to transfer, at high speed, image data from the input buffer memory to the data memory because such transfer is made by way of the encoding unit.

SUMMARY OF THE INVENTION

Accordingly, it is an object of this invention to provide an improved image processor having the ability to transfer, at high speed, image data from the input buffer memory to the data memory.

In order to achieve the object, the present image processor is provided with a bus switch, a data transfer control unit is disposed in addition to the encoding unit, and handshaking between these units is used. In response to a data request signal from the encoding unit indicative of a request for the transfer of new image data, the data transfer control unit causes the bus switch to switch so as to control the transfer of image data from the input buffer memory to the data memory (a data transfer mode). Upon completion of the transfer of one unit of image data, the data transfer control unit sends a data transfer completion signal indicating that the transfer of the requested image data has been completed, to the encoding unit. Thereafter, in order to make the encoding unit accessible to the data memory, the bus switch is switched (an encoding mode).

DETAILED DESCRIPTION OF THE INVENTION

Figure 1:
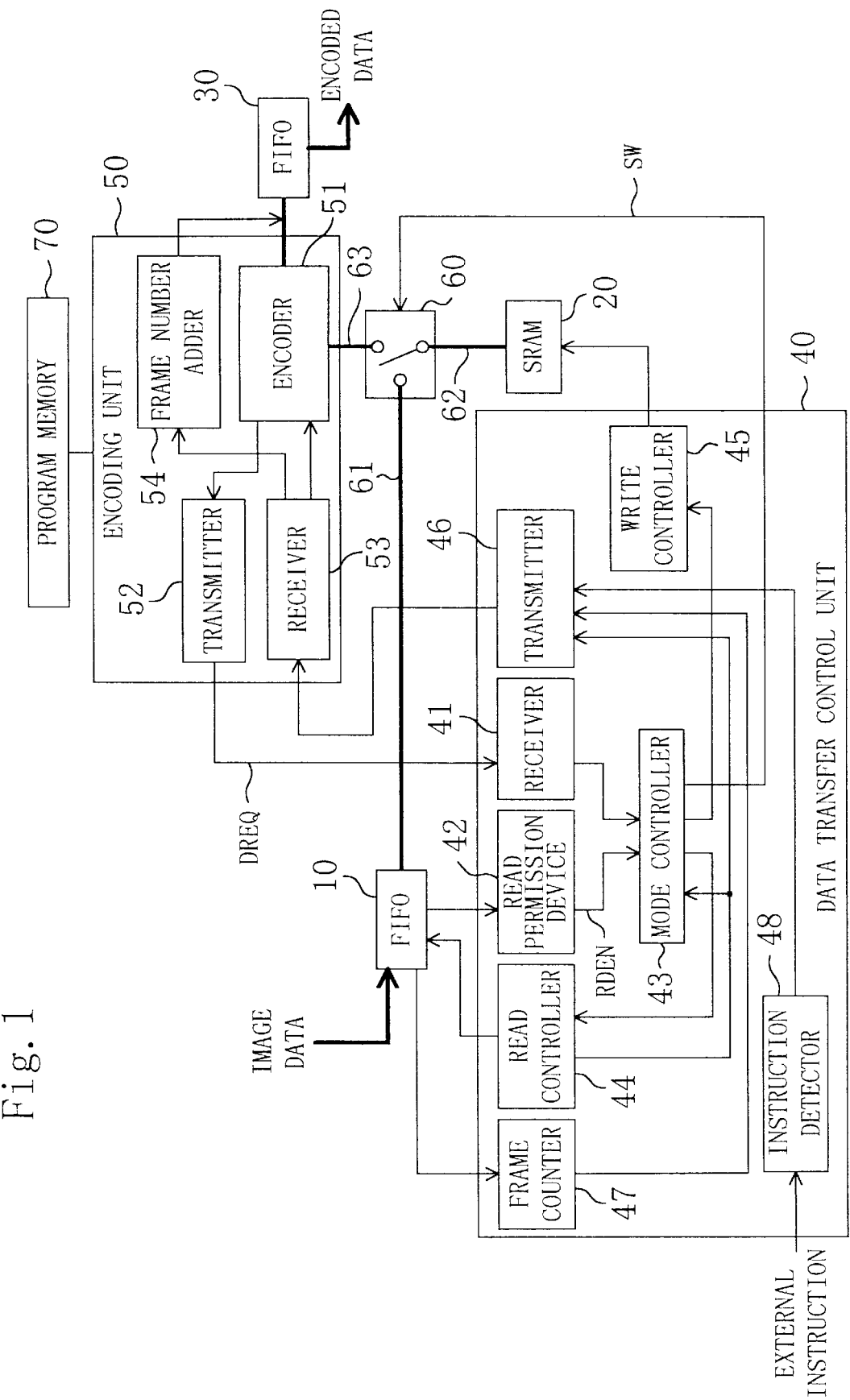
FIG. 1 shows in block form an image processor of the present invention.

Referring first to FIG. 1, an image processor of the present invention is illustrated. The image processor of FIG. 1 has these components: an input buffer memory 10 formed of an FIFO memory and disposed to temporarily hold input image data; a data memory 20 formed of an SRAM and disposed to store image data transferred from the input buffer memory 10; an output buffer memory 30 formed of an FIFO memory and disposed to temporarily hold encoded data; a data transfer control unit (DTCU) 40 disposed to govern the transfer of image data from the input buffer memory 10 to the data memory 20; an encoding unit 50 formed of a program-controllable processor and disposed to encode image data stored in the data memory 20; a bus switch 60; and a program memory 70 disposed to store a program which determines an encoding system.

The encoding unit 50 includes an encoder 51 that is the core of the encoding unit 50, a transmitter 52 disposed to send to the DTCU 40 a data request signal DREQ indicative of a request for the transfer of new image data, and a receiver 53 responsive to a transfer completion signal from the DTCU 40 indicative of the transfer completion of image data and disposed to cause the encoder 51 to start performing encoding processing upon receipt thereof.

The input buffer memory 10 is coupled to a bus 61. The data memory 20 is coupled to a bus 62. The encoder 51 is coupled to a bus 63. The bus switch 60 is operable to switch between a first bus connection of the input buffer memory 10 and the data memory 20 (that is, the first bus connection establishes connection between the bus 61 and the bus 62) and a second bus connection of the data memory 20 and the encoder 51 (that is, the second bus connection establishes connection between the bus 62 and the bus 63).

The DTCU 40 has these components: a receiver 41 disposed to receive SIGNAL DREQ from the transmitter 52 of the encoding unit 50; a read permission device 42 disposed to determine whether the input buffer memory 10 has finished storing one frame of image data (in other words the read permission device 42 determines if the input buffer memory 10 is in a state ready for the reading of new image data), and to issue a read enable signal RDEN when the input buffer memory 10 is determined to be in such a state; a mode controller 43 disposed to select the data transfer mode when the receiver 41 receives SIGNAL DREQ and when the read permission device 42 issues SIGNAL RDEN, to issue a switch signal SW which causes the bus switch 60 to select the first bus connection; a read controller 44 disposed to control the reading of one frame of image data from the input buffer memory 10 when the data transfer mode is chosen, and to issue a read completion signal when the reading of the one-frame image data is completed; a write controller 45 disposed to control the writing of image data, transmitted from the input buffer memory 10 via the bus switch 60, into the data memory 20; and a transmitter 46 disposed to send to the encoding unit 50 the transfer completion signal when the read controller 44 issues the read completion signal. When the read controller 44 issues the read completion signal, the mode controller 43 selects the encoding mode and controls the bus switch 60 to select the second bus connection.

The DTCU 40 further includes a frame counter 47 and an instruction detector 48, and the encoding unit 50 further includes a frame number adder 54. The frame counter 47 is started at zero and incremented by one up to 29 each time one frame of image data is read out from the input buffer memory 10. The instruction detector 48 is operable to detect an external instruction. Such an external instruction includes an instruction which requests the encoder 51 to stop carrying out encoding processing, i.e., an encoding completion instruction. The transmitter 46 of the DTCU 40 sends to the encoding unit 50 a count value of the frame counter 47 and an external instruction detected by the instruction detector 48 together with the foregoing transfer completion signal, either in serial or in parallel. The encoder 51 determines an encoding form according to the external instruction received at the receiver 53. Using the foregoing count value of the frame counter 47 as a frame number, the frame number adder 54 adds the frame number to encoded data which is a result of the processing by the encoder 51.

In accordance with the image processor shown in FIG. 1, the read permission device 42 of the DTCU 40 issues SIGNAL RDEN when the input buffer memory 10 accumulates therein one frame of image data. At this time, the frame counter 47 counts the number of image data frames transmitted to the input buffer memory 10 and notifies the transmitter 46 of a result of the counting as a frame number. Further, the instruction detector 48 notifies the transmitter 46 of the presence or absence of an encoding completion instruction.

If both SIGNALS RDEN and DREQ are valid, then the mode controller 43 makes a judgement that the current mode is the data transfer mode. In this case, the mode controller 43 causes the bus switch 60 to select the connection of the input buffer memory 10 and the data memory 20 and notifies both the read controller 44 and the write controller 45 of the fact that the current mode is the data transfer mode. The read controller 44 reads in series image data from the input buffer memory 10. The write controller 45 writes in series image data from the input buffer memory 10 into the data memory 20. Upon completion of the reading of one frame of image data from the input buffer memory 10, the read controller 44 notifies the mode controller 43 and the transmitter 46 of such read completion. The mode controller 43 controls the bus switch 60 to select the connection of the data memory 20 and the encoder 51. The transmitter 46 sends one bit indicative of the presence or absence of an encoding completion instruction and a plurality of bits indicative of a frame number, together with a transfer completion signal, to the encoding unit 50. The encoder 51 starts encoding image data transferred to the data memory 20 on the basis of information received at the receiver 53, only in the absence of an encoding completion instruction. The frame number adder 54 adds a frame number to encoded data which is a result of the processing by the encoder 51.

As described above, in according with the FIG. 1 organization, handshaking is established between the encoding unit 50 and the DTCU 40, and it is arranged such that the DTCU 40 controls the direct transfer of data from the input buffer memory 10 to the data memory 20. As a result of such arrangement, the transfer of data can be carried out at high speed. Additionally, all of the transfer completion signal, the encoding completion instruction, and the frame number are transmitted from the DTCU 40 to the encoding unit 50 at the same time, which makes it possible to produce complete synchronization of the operation of the encoding unit 50 with one-frame image data.

In the above-described organization, the processing of counting is carried out by frame unit. Counting may be made either by MB (macroblock) unit or by GOB (group of blocks) unit. The external instruction which is fed to the instruction detector 48 may be an instruction for designating the size of image data to be processed by the encoder 51. In such a case, it is possible to switch between the encoding of image data of the CIF (common intermediate format) size (i.e., 352×288 pixels) and the encoding of image data of the QCIF (quarter CIF) size (i.e., 176×144 pixels), without having to stop the operation of the encoder 51. The external instruction may be an instruction which designates the size of code data which is a result of the processing by the encoder 51. The external instruction may be an instruction which designates the resolution of an image relating to image data to be processed by the encoder 51. The external instruction may be an instruction which designates the resolution of an image relating to encoded data which is a result of the processing by the encoder 51. An external instruction may be fed to the instruction detector 48 for designating the location of a target pixel. For example, the encoder 51 cuts image data of the QCIF size at a designated location out of image data of the CIF size. The external instruction may be an instruction which designates the form of predictive encoding in the encoder 51 (the intra-frame predictive encoding or the inter-frame predictive encoding). It may be designed such that information for the control of frame rate (the control of code generation amount) and for determining the transmission rate of encoded data is fed from the DTCU 40 to the encoding unit 50, together with transfer completion signal.

Figure 2:
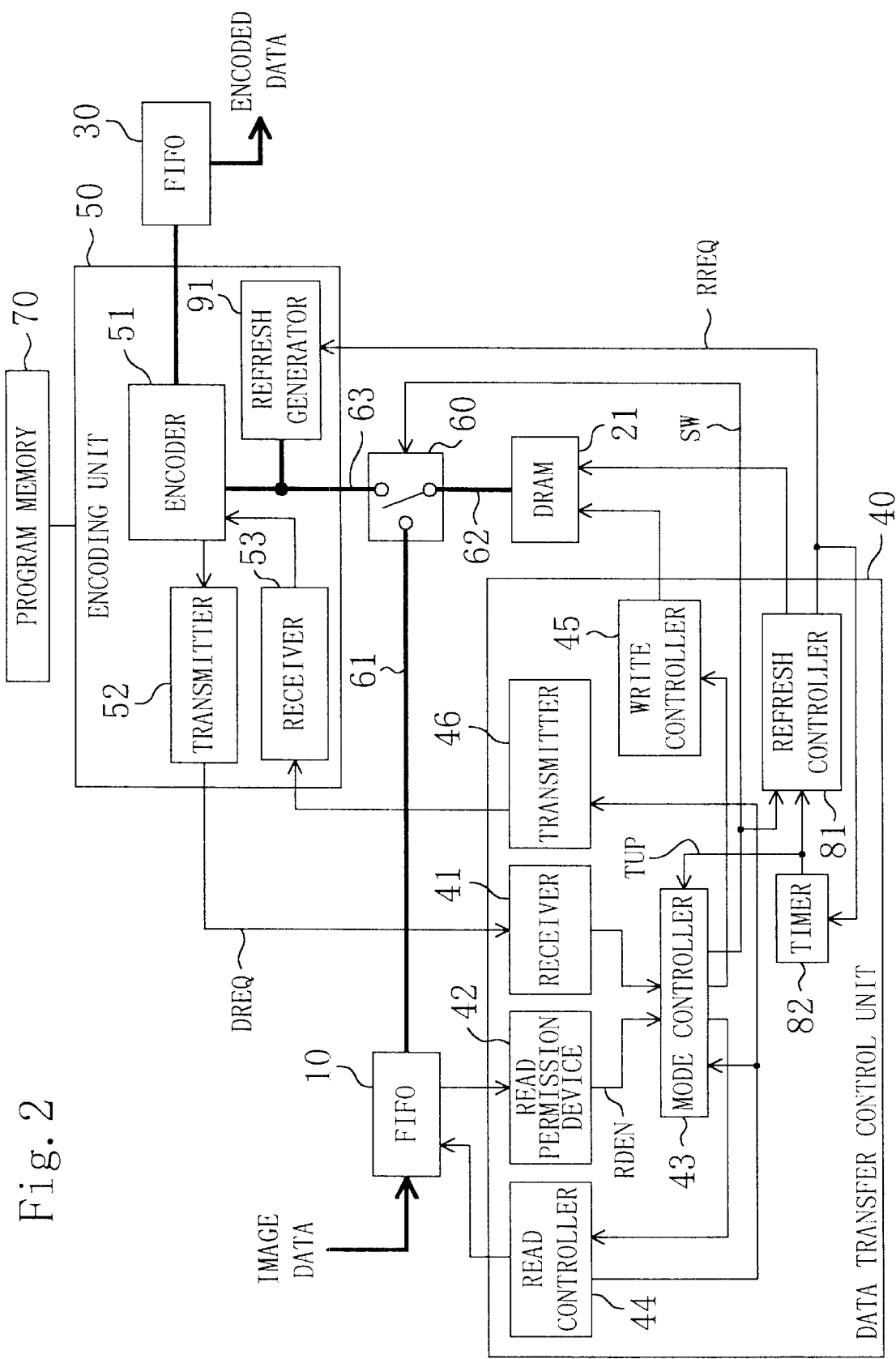
FIG. 2 shows in block form another image processor of the present invention.

FIG. 2 shows another image processor according to the present invention. The image processor of FIG. 2 has a data memory 21 formed of a DRAM (dynamic RAM) having a fast page mode. The DTCU 40 has a refresh controller 81 and a timer 82, and the encoding unit 50 has a refresh generator 91. The refresh controller 81 sends a refresh request signal RREQ indicative of a request for the refreshing of the data memory 21 in the encoding mode while on the other hand the refresh controller 81 directly refreshes the data memory 21 in the data transfer mode. The refresh generator 91 refreshes the data memory 21 via the bus switch 60 when SIGNAL RREQ is issued. The timer 82 waits for a predetermined period of time, during which the refreshing of the data memory 21 is expected to finish, from the time SIGNAL RREQ is issued in the encoding mode, and sends a timeup signal TUP. The mode controller 43 waits for SIGNAL TUP to be issued and then directs a change from the encoding mode to the data transfer mode to be made.

Figure 3:
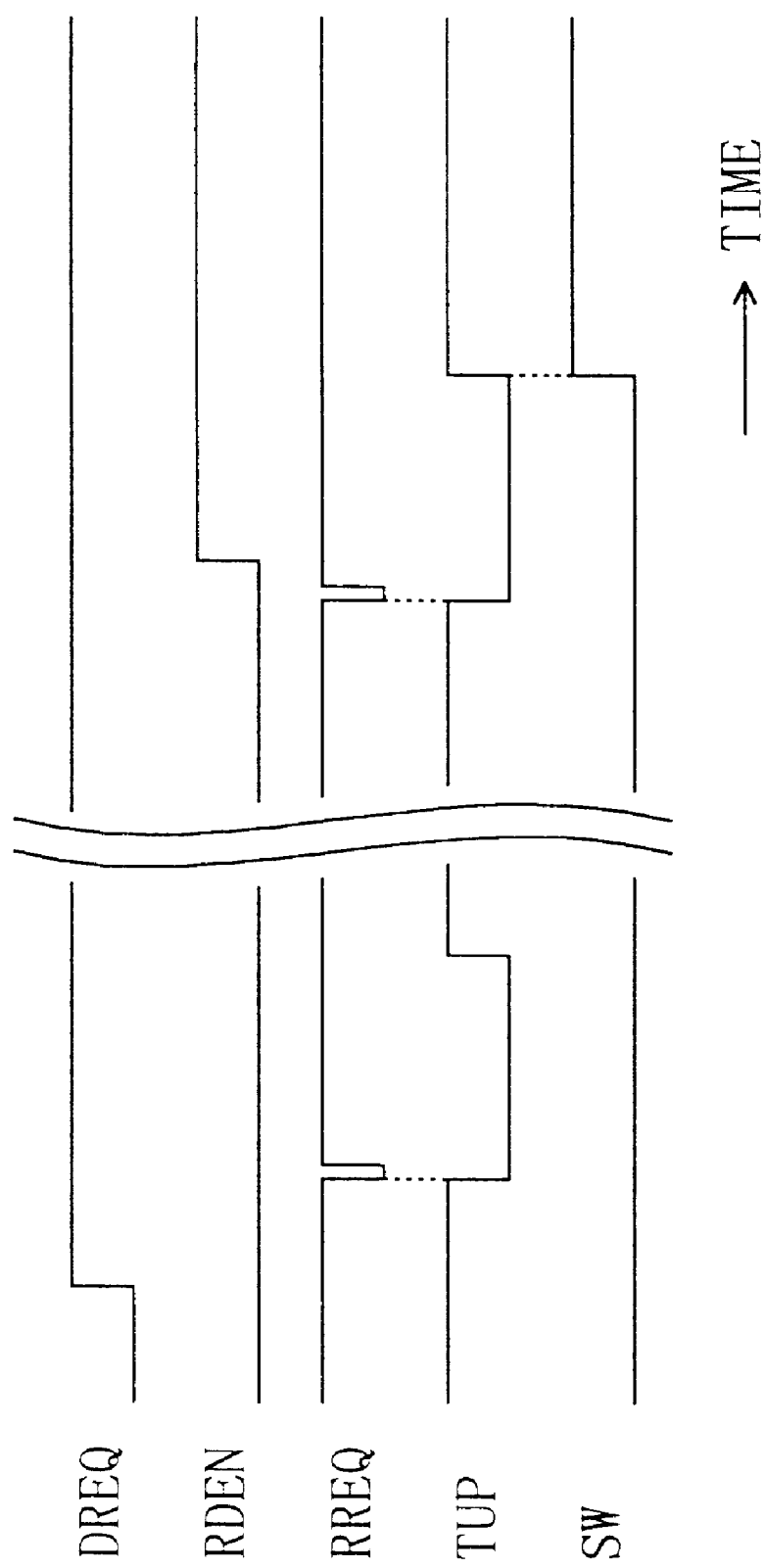
FIG. 3 is a timing diagram useful in understanding the operation of the image processor of FIG. 2.

FIG. 3 shows the operation of the image processor of FIG. 2. The timer 82 waits for a predetermined period from the time SIGNAL RREQ becomes the valid "L" in the encoding mode, before causing SIGNAL TUP to become the valid "H". If the bus switch 60 is switched to select the connection of the input buffer memory 10 and the data memory 21 the moment that SIGNALS DREQ and RDEN each become the valid "H", this prevents the refresh generator 91 from refreshing the data memory 21. The mode controller 43 therefore waits for SIGNAL TUP to become valid before directing a change from the encoding mode to the data transfer mode to be made, even when both SIGNALS DREQ and RDEN become the valid "H".

Figure 4:
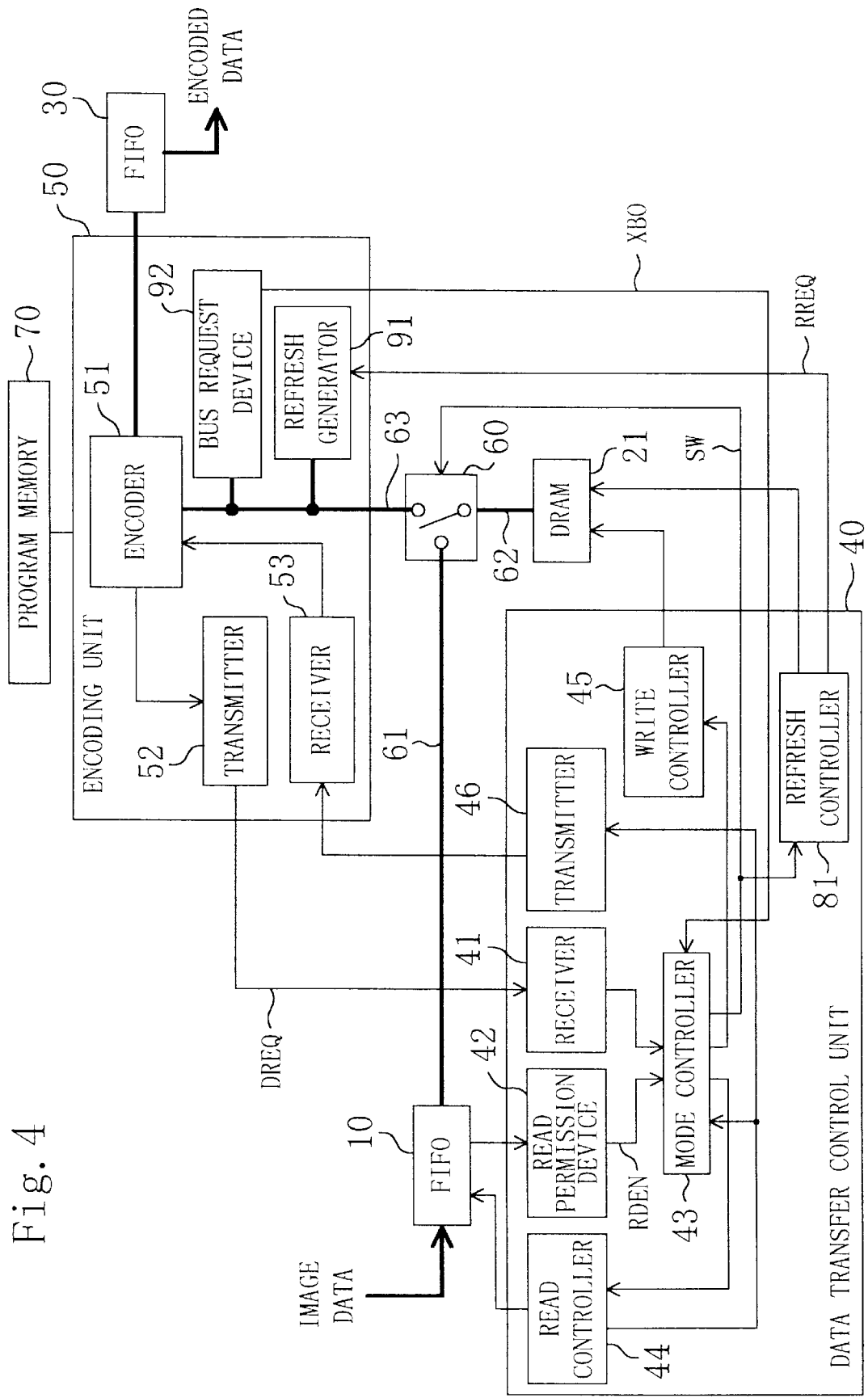
FIG. 4 shows in block form still another image processor of the present invention.

FIG. 4 shows still another image processor in accordance with the present invention. Also in the image processor shown in FIG. 4, the data memory 21 is formed of a DRAM. The DTCU 40 has the refresh controller 81, and the encoding unit 50 has the refresh generator 91 and a bus request device 92. The bus request device 92 issues a bus occupation signal XBO during the refreshing of the data memory 21. The mode controller 43 waits for SIGNAL XBO to be invalidated, before directing a change from the encoding mode to the data transfer mode to be made.

Figure 5:
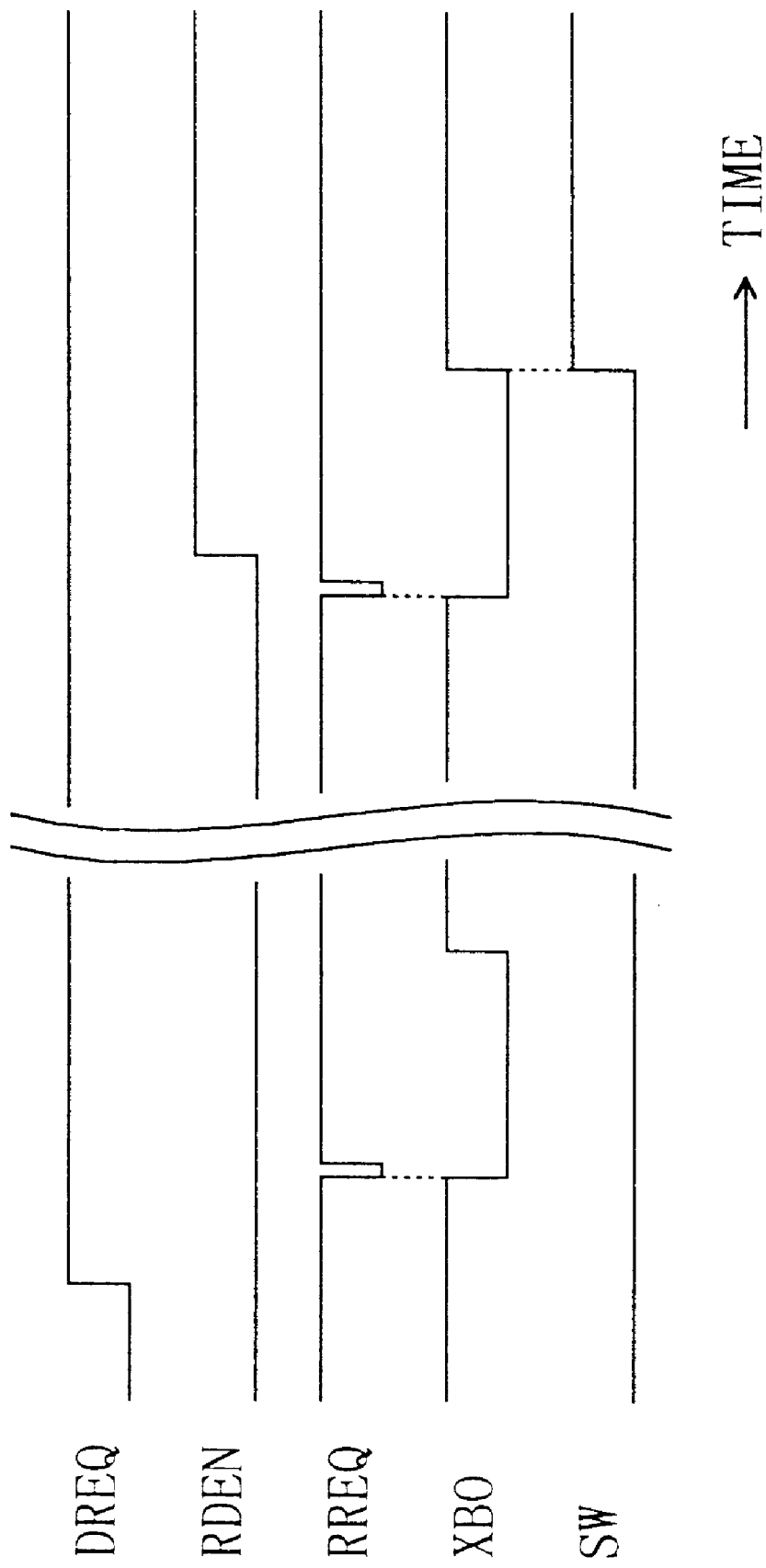
FIG. 5 is a timing diagram useful in understanding the operation of the image processor of FIG. 4.

Referring now to FIG. 5, the operation of the image processor of FIG. 4 is illustrated. The bus request device 92 holds SIGNAL XBO at the valid "L" for a period from the time SIGNAL RREQ becomes the valid "L" in the encoding mode to the time the refreshing of the data memory 21 is completed. The mode controller 43 waits for SIGNAL XBO to become the invalid "H" before directing a change from the encoding mode to the data transfer mode to be made, even when both SIGNALS DREQ and RDEN become valid.

Figure 6:
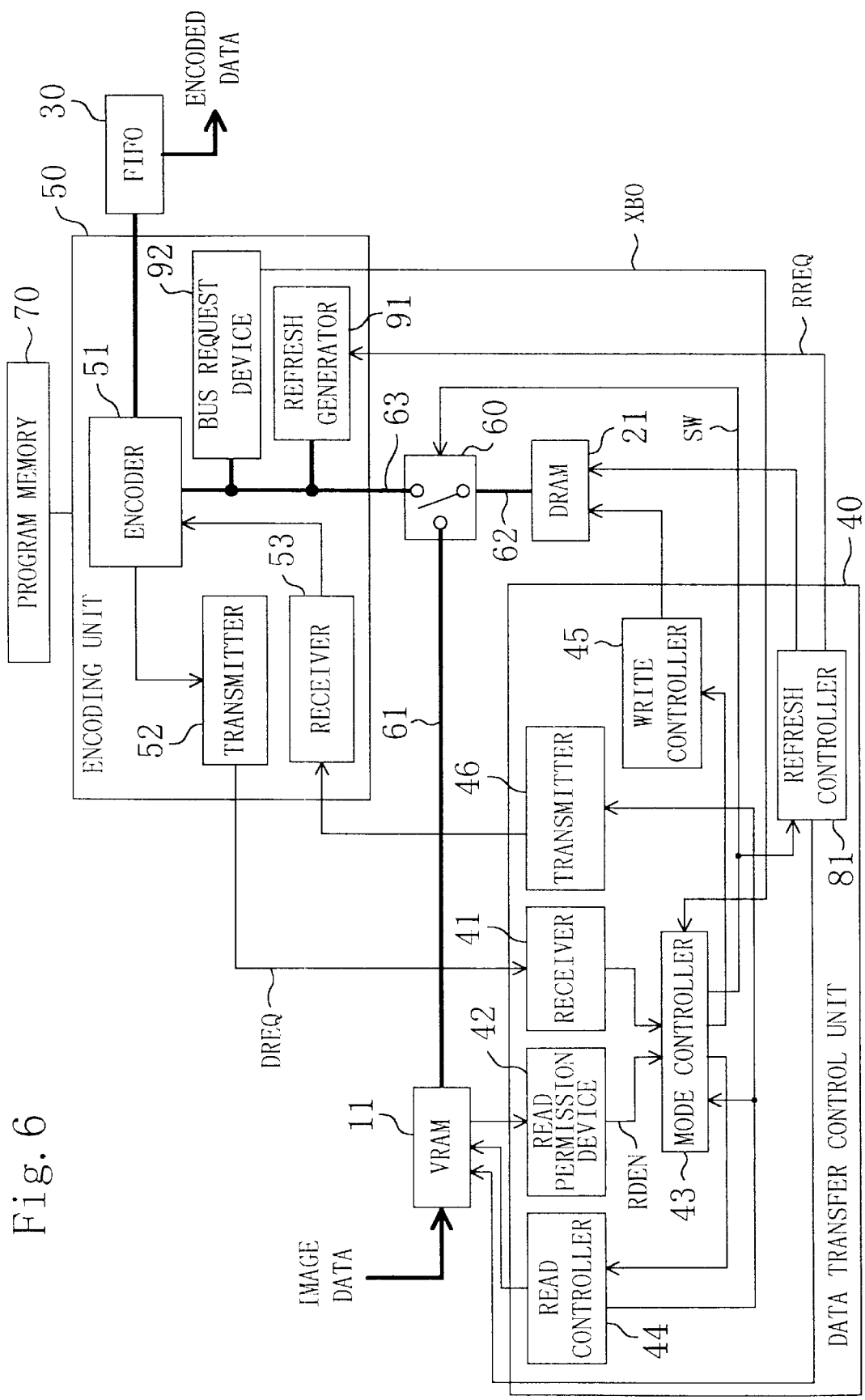
FIG. 6 shows in block form an image processor of the present invention.

Referring now to FIG. 6, therein shown is another image processor of the present invention. In the image processor shown in FIG. 6, the data memory 21 is formed of a DRAM, and an input buffer memory 11 is an addressable VRAM (video RAM). The DTCU 40 has the refresh controller 81, and the encoding unit 50 has the refresh generator 91 and the bus request device 92. The read controller 44 designates the read address of the input buffer memory 11, and the write controller 45 designates the write address of the data memory 21. The refresh controller 81 governs not only the refreshing of the data memory 21 but also the refreshing of the input buffer memory 11.

In accordance with the FIG. 6 organization, image data are written into the input buffer memory 11 in order of pixel locations and in, for example, a 4:2:2 format. The read and write controllers 44 and 45 of the DTCU 40 designate the read addresses of the input buffer memory 11 and the write addresses of the data memory 21 respectively so that image data can be stored in the data memory 21, in, for example, a 4:2:0 format. As a result of this arrangement, image data downsampling can be achieved in the data transfer mode. Additionally, luminance data Y, first chrominance data Cb, and second chrominance data Cr are stored at different regions of the data memory 21, in consideration of the convenience of encoding. At the time of the transfer of data, fast page mode is selected for each of the input buffer memory 11 and the data memory 21.

As describe above, the FIG. 6 organization makes it possible to provide an arrangement of data that is easy to process in the encoding unit 50, by making utilization of image data transfer time and, at the same time, chrominance data can be format converted. This relieves the processing load of the encoding unit 50.

Figure 7:
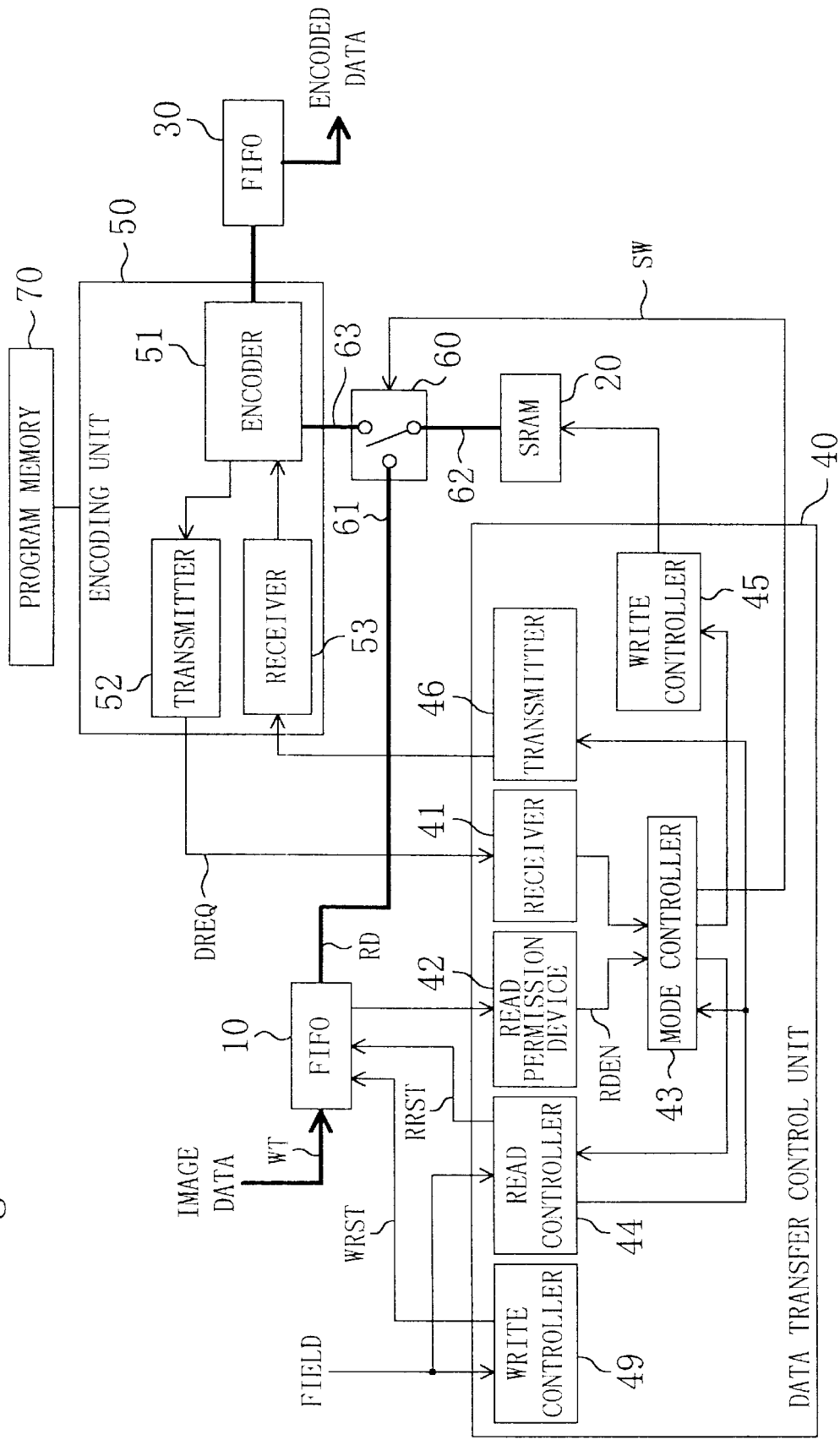
FIG. 7 shows in block form another image processor of the present invention.

FIG. 7 illustrates still another image processor of the present invention. In the image processor shown in FIG. 7, the input buffer memory 10 is formed of an FIFO memory. The DTCU 40 has a write controller 49 in addition to the read controller 44. This write controller 49 governs the write operation of the input buffer memory 10 so that new image data can be written into the input buffer memory 10 at constant cycle even when the input buffer memory 10 is being read. A field signal FIELD, shown in FIG. 7, is a signal indicative of whether the current field is an odd-numbered field or an even-numbered filed. SIGNAL FIELD is applied to the read controller 44 and to the write controller 49. WT indicates write data to the input buffer memory 10, and RD indicates read data from the input buffer memory 10. Here suppose that one frame is composed of only one odd-numbered field. In other words, data of an even-numbered field of input image data are not written to the input buffer memory 10. WRST is a write reset signal supplied from the write controller 49 to the input buffer memory 10. When the input buffer memory 10 is fed SIGNAL WRST, the write address of the input buffer memory 10 is reset to zero. RRST is a read reset signal supplied from the read controller 44 to the input buffer memory 10. When the input buffer memory 10 is fed SIGNAL RRST, the read address of the input buffer memory 10 is reset to zero.

Figure 8:
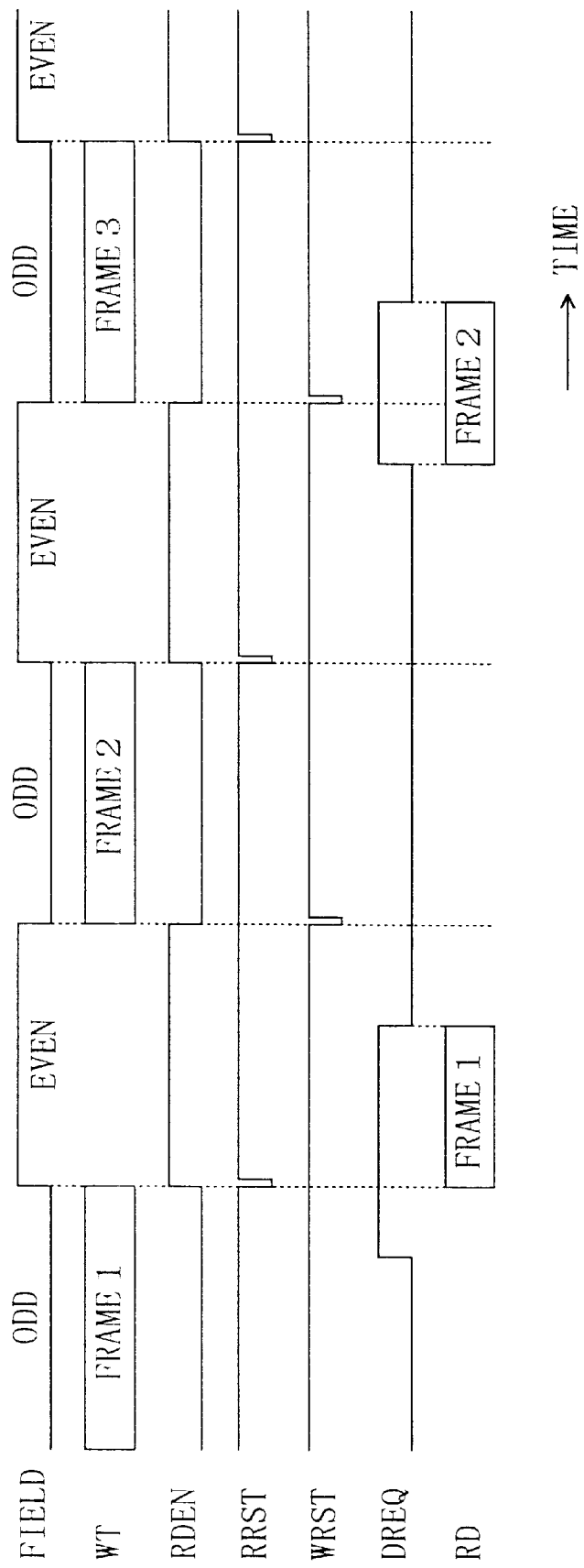
FIG. 8 is a timing diagram useful in understanding the operation of the image processor of FIG. 7.

The operation of the image processor of FIG. 7 is shown by FIG. 8. The write controller 49 causes SIGNAL WRST to become the valid "L" every time the odd-numbered field period starts, as a result of which image data of each odd-numbered field are written into the input buffer memory 10. On the other hand, every time the even-numbered field period starts the read permission device 42 causes SIGNAL RDEN to become the valid "H" and the read controller 44 causes SIGNAL RRST to become the valid "L".

As can be seen from FIG. 8, in the event that SIGNAL DREQ makes a transition from "L" (invalid) to "H" (valid) during the odd-numbered field period, it is not until SIGNAL RDEN becomes valid that the processing of reading from the input buffer memory 10 starts. Referring still to FIG. 7, the processing of reading from the input buffer memory 10 starts as soon as SIGNAL DREQ makes a transition from "L" to "H" during the even-numbered field period. Therefore, in the latter case, during the following odd-numbered field period, the process of reading from the input buffer memory 10 is carried out concurrently with the process of writing to the input buffer memory 10. However, it is controlled such that the read address does not exceed the write address in the input buffer memory 10.

In the FIG. 7 organization, it is arranged such that new image data are written into the input buffer memory 10 at constant cycle even when the input buffer memory 10 is being read, which prevents the input buffer memory 10 from failing to undergo updating.

Figure 9:
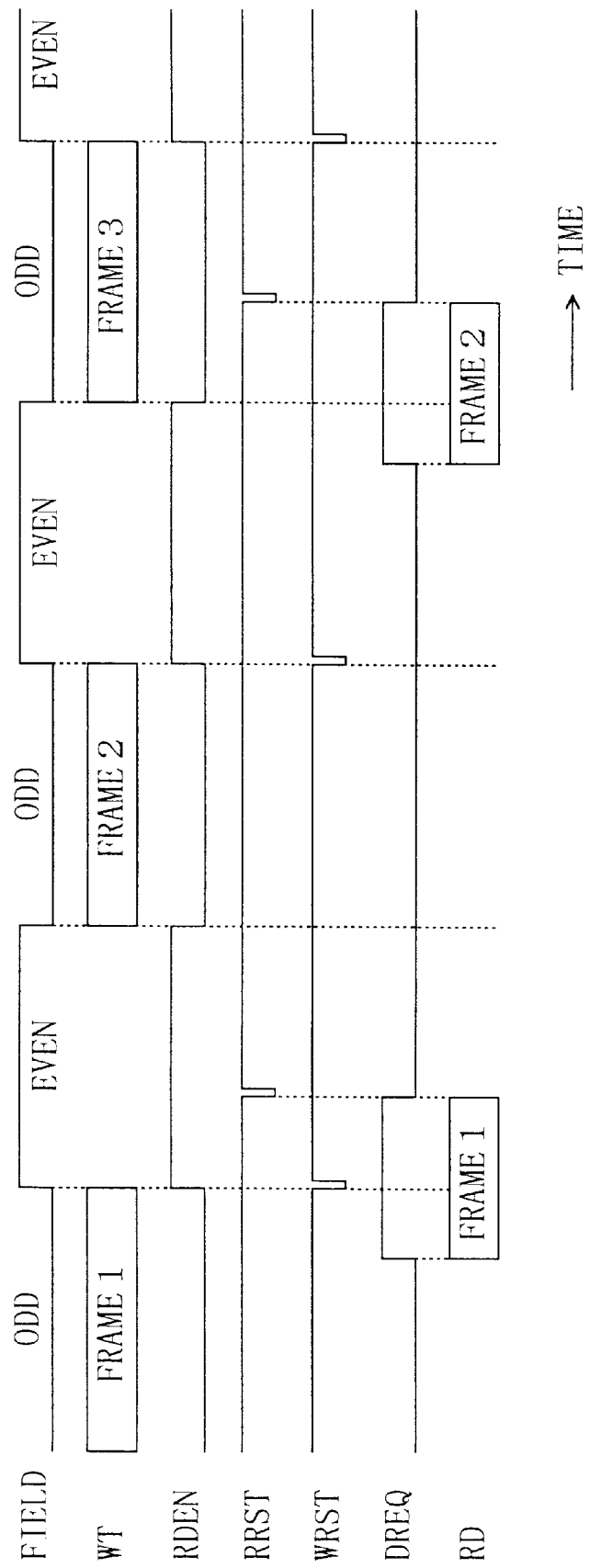
FIG. 9 is a timing diagram useful in understanding the operation of a modification of FIG. 8.

FIG. 9 illustrates a modification of FIG. 8. According to FIG. 9, it is arranged such that SIGNAL WRST becomes the valid "L" every time the even-numbered field period starts, in other words every time the process of writing one frame of image data into the input buffer memory 10 is completed. Additionally it is arranged such that SIGNAL RRST becomes the valid "L" every time SIGNAL DREQ makes a transition from "H" (valid) to "L" (invalid), in other words every time the process of reading one frame of image data from the input buffer memory 10 is completed. In the event that SIGNAL DREQ makes a transition from "L" to "H" during the odd-numbered field period, the mode controller 43 does not wait for SIGNAL RDEN to be made valid by accumulation of one frame of image data in the input buffer memory 10. Instead, the mode controller 43 controls the input buffer memory 10 such that the processing of reading from the input buffer memory 10 starts. This advances the staring point of reading from the input buffer memory 10.

The invention claimed is:

1. An image processor comprising:

an input buffer memory for temporarily holding input image data;

a data memory for storing said image data transferred from said input buffer memory;

a data transfer control unit for controlling the transfer of said image data from said input buffer memory to said data memory;

an encoding unit having an encoder for encoding said image data stored in said data memory; and a bus switch for selecting between a first bus connection of said input buffer memory and said data memory and a second bus connection of said data memory and said encoder;

said encoding unit further including:

a transmitter for sending to said data transfer control unit a data request signal indicative of a request for the transfer of new image data from said input buffer memory; and a receiver for causing, in response to a transfer completion signal received from said data transfer control unit and indicating that the transfer of said image data is completed, said encoder to start encoding said image;

said data transfer control unit including:

a receiver for receiving said data request signal transmitted from said transmitter of said encoding unit;

a read permission device for determining whether said input buffer memory is in a state capable of meeting said data transfer request and issuing a read enable signal when said input buffer memory is in said state;

a mode controller for selecting a data transfer mode of said image processor when said receiver of said data transfer control unit receives said data request signal and when said read permission device issues said read enable signal and controlling said bus switch to select said first bus connection;

a read controller for controlling the reading of one unit of image data from said input buffer memory when said mode controller selects said data transfer mode and issuing a read completion signal when the reading of said image data is completed;

a write controller for controlling the writing of said image data, transferred from said input buffer memory by way of said bus switch, into said data memory when said mode controller selects said data transfer mode; and a transmitter for sending said transfer completion signal to said encoding unit when said read controller issues said read completion signal;

wherein said mode controller has operational functions of selecting an encoding mode of said image processor when said read controller issues said read completion signal and controlling said bus switch to select said second bus connection.

2. The image processor of claim 1 wherein said input buffer memory is a first-In first-out memory.

3. The image processor of claim 1 wherein said input buffer memory is a video random access memory.

4. The image processor of claim 1 wherein said input buffer memory is a static random access memory.

5. The image processor of claim 1 wherein said input buffer memory is a dynamic random access memory.

6. The image processor of claim 1 further comprising an output buffer memory for temporarily holding encoded data produced by said encoder and providing said encoded data.

7. The image processor of claim 6 wherein said output buffer memory is a first-in first-out memory.

8. The image processor of claim 1 further comprising a program memory for storing a program which determines an encoding system to be employed by said encoder.

9. The image processor of claim 1, said data transfer control unit further including a counter, the count value of said counter being increased every time one unit of image data is read from said input buffer memory; and said transmitter of said data transfer control unit having an operational function of transmitting a count value of said counter to said encoding unit together with said transfer completion signal.

10. The image processor of claim 9 wherein said encoding unit further includes a number adder for adding said count value of said counter received at said receiver of said encoding unit, to encoded data produced by said encoder.

11. The image processor of claim 1, said data transfer control unit further including an instruction detector for detecting an external instruction; and said transmitter of said data transfer control unit having an operational function of sending said external instruction detected by said instruction detector to said encoding unit together with said transfer completion signal.

12. The image processor of claim 11 wherein said encoder of said encoding unit has an operational function of determining an encoding form according to said external instruction received by said receiver of said encoding unit.

13. The image processor of claim 11 wherein said external instruction is an instruction which requests said encoder to stop performing encoding processing.

14. The image processor of claim 11 wherein said external instruction is an instruction which designates a size of image data which is a target of encoding processing by said encoder.

15. The image processor of claim 11 wherein said external instruction is an instruction which designates a size of encoded data produced by said encoder.

16. The image processor of claim 11 wherein said external instruction is an instruction which designates a resolution of an image relating to image data which is a target of encoding processing by said encoder.

17. The image processor of claim 11 wherein said external instruction is an instruction which designates a resolution of an image relating to encoded data produced by said encoder.

18. The image processor of claim 11 wherein said external instruction is an instruction which designates a form of predictive encoding by said encoder.

19. The image processor of claim 1, said data transfer control unit further including:

a refresh controller for issuing a refresh request signal indicative of a request for the refreshing of said data memory in said encoding mode and directly refreshing said data memory in said data transfer mode; and a timer for waiting for a predetermined period of time, during which the refreshing of said data memory is expected to finish, from the time said refresh signal is issued and issuing a timeup signal;

said encoding unit further including a refresh generator for refreshing said data memory via said bus switch when said refresh request signal is issued; and said mode controller having an operational function of waiting for said timeup signal to be issued and directing a change from said encoding mode to said data transfer mode to be made.

20. The image processor of claim 1, said data transfer control unit including a refresh controller for issuing a refresh request signal indicative of a request for the refreshing of said data memory in said encoding mode and directly refreshing said data memory in said data transfer mode;

said encoding unit further including:
- a refresh generator for refreshing said data memory via said bus switch when said refresh request signal is issued; and
- a bus request device for issuing a bus occupation signal during the refreshing of said data memory; and
- said mode controller having an operational function of waiting for said bus occupation signal to be invalidated and directing a change from said encoding mode to said data transfer mode to be made.

21. The image processor of claim 1, said read controller having an operational function of designating a read address of said input buffer memory; and said write controller having an operational function of designating a write address of said data memory.

22. The image processor of claim 1 wherein said data transfer control unit further includes a write controller for controlling the writing operation of said input buffer memory so that new image data can be written into said input buffer memory at constant cycle even when said input buffer memory is being read.

* * * * *